(12) United States Patent
Fong et al.

(10) Patent No.: US 6,736,243 B1
(45) Date of Patent: May 18, 2004

(54) MECHANICAL TYPE DISC BRAKE FOR BICYCLE

(75) Inventors: Zhang-Hua Fong, Chiai (TW); Su-Hsien Liao, Taibau (TW); Dein Shaw, Hsinchu (TW); Hong-Guang Ding, Taoyuan (TW)

(73) Assignee: National Science Council, Taipei (TW)

( * ) Notice: Subject to any disclaimer, the term of this patent is extended or adjusted under 35 U.S.C. 154(b) by 0 days.

(21) Appl. No.: 10/421,715

(22) Filed: Apr. 24, 2003

(51) Int. Cl.[7] ................................................. B62L 5/00
(52) U.S. Cl. ........................................... 188/26; 188/17
(58) Field of Search ............................... 188/26, 24.11, 188/72.9, 17, 72.7, 72.3, 72.1

(56) References Cited

U.S. PATENT DOCUMENTS 3,878,921 A * 4/1975 Kibler et al. ................. 188/26
5,960,914 A * 10/1999 Isai ............................. 188/72.8
6,206,144 B1 * 3/2001 Di Bella ....................... 188/26

* cited by examiner

Primary Examiner—Robert A. Siconolfi
Assistant Examiner—Melanie Torres
(74) Attorney, Agent, or Firm—Rabin & Berdo, P.C.

(57) ABSTRACT

A mechanical type disc brake for bicycle mainly includes a housing, a mounting bracket for connecting the housing to a fork of the bicycle, a pull bar pivotally connected to an outer side of the housing, an actuating rod extended into the housing via the pull bar, and a toggle mechanism, two sliders, two brake linings, and a restoring element separately mounted in a locating space in the house at predetermined positions. When the pull bar is pulled, the actuating rod is caused to vertically act on the toggle mechanism for two actuating blocks thereof to move outward and push the sliders and the brake linings to create a brake effect. Contact surfaces between the actuating blocks of the toggle mechanism and the sliders are cambered surfaces to avoid an overly large frictional force between the brake linings and brake discs that would result in a brake dragging.

30 Claims, 11 Drawing Sheets

MECHANICAL TYPE DISC BRAKE FOR BICYCLE

FIELD OF THE INVENTION

The present invention relates to a disc brake for bicycle, and more particularly to a mechanical type disc brake in which a toggle mechanism cooperates with a pull bar to amplify a force applied to the toggle mechanism via the pull bar, so as to increase a tail braking force and avoid brake dragging.

BACKGROUND OF THE INVENTION

A bicycle has developed from a conventional traffic means into a means useful in many specific fields. There are more and more people using bicycles in a variety of occasions. Functional requirements for a bicycle are much more strict than ever before, particularly a good brake system that involves the safety of riding the bicycle has drawn people's high attention to it. Among different types of braking mechanisms for bicycles, there is a rim brake that is also referred to as a V-type brake. The rim brake gradually fails to satisfy the current requirements for safety in riding a bicycle, particularly a cross-country or a mountain-climbing bicycle. For a bicycle to maintain an absolutely safe braking performance and a highly sensitive mobility under very bad weather and riding environments, it is necessary to develop a new braking mechanism for bicycle to satisfy the strict requirements. A mechanical-type disk brake has gradually drawn people's attention because it has been tested and proven to be safer and more comfortable for use than the V-type brake.

U.S. Pat. No. 3,878,921 discloses a brake system for bicycle, and U.S. Pat. No. 3,927,736 discloses a disk brake for bicycle, both of which have considerably simple structures that enable easy production and assembly thereof. However, these types of brake systems for bicycle all are subjected to a locked brake due to an overly high friction among components thereof and are therefore very dangerous to bicycle riders and need further improvements. Another problem with the conventional mechanical-type disk brake for bicycle is a weak tail braking force that could not be effectively enhanced up to date.

U.S. Pat. No. 3,997,033 discloses a disk brake mechanism that has the advantages of simple structure, easy to assemble, and smoothly developed braking force. However, this type of disk brake does not have the effect of amplifying the braking force to result in an insufficient braking force, and does not have proper restoring means to result in delayed return of brake shoes. That is, this type of disk brake is less sensitive.

In addition, the steel cable employed in general mechanical-type disk brake, as being limited by a tension thereof, prevents the conventional mechanical-type disk brake for bicycle from having an enhanced tail braking force.

It is therefore tried by the inventor to develop a new mechanical-type disk brake for bicycle to eliminate the above-mentioned disadvantages.

SUMMARY OF THE INVENTION

A primary object of the present invention is to provide a mechanical type disc brake for bicycle to effectively increase the braking force, provide an ideal brake curve, and prevent a brake dragging due to an overly large frictional force between the brake linings and the brake discs.

To achieve the above object, the present invention mainly includes a housing, a mounting bracket for connecting the housing to a fork of the bicycle, a pull bar pivotally connected to an outer side of the housing, an actuating rod extended into the housing via the pull bar, and a toggle mechanism, sliders, brake linings, and a restoring element separately mounted in a locating space in the house at predetermined positions. When the pull bar is pulled to cause the actuating rod to vertically act on the toggle mechanism, two actuating blocks of the toggle mechanism are moved outward to push against the sliders and the brake linings to create a brake effect. Contact surfaces between the actuating blocks of the toggle mechanism and the sliders are cambered surfaces to avoid an overly large frictional force between the brake linings and brake discs that would result in a brake dragging.

Another object of the present invention is to provide a mechanical type disc brake for bicycle that employs the principle of leverage to amplified a force applied to brake the bicycle, so that the bicycle always has good brake performance under different riding environments, and the problem of weak tail braking force often occurred in general mechanical type disc brake can be solved.

A further object of the present invention is to provide a mechanical type disc brake for bicycle that includes restoring means for an actuating rod and brake linings thereof to actually return their initial positions after a braking force is removed, so that the disc brake can be more accurately controlled.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
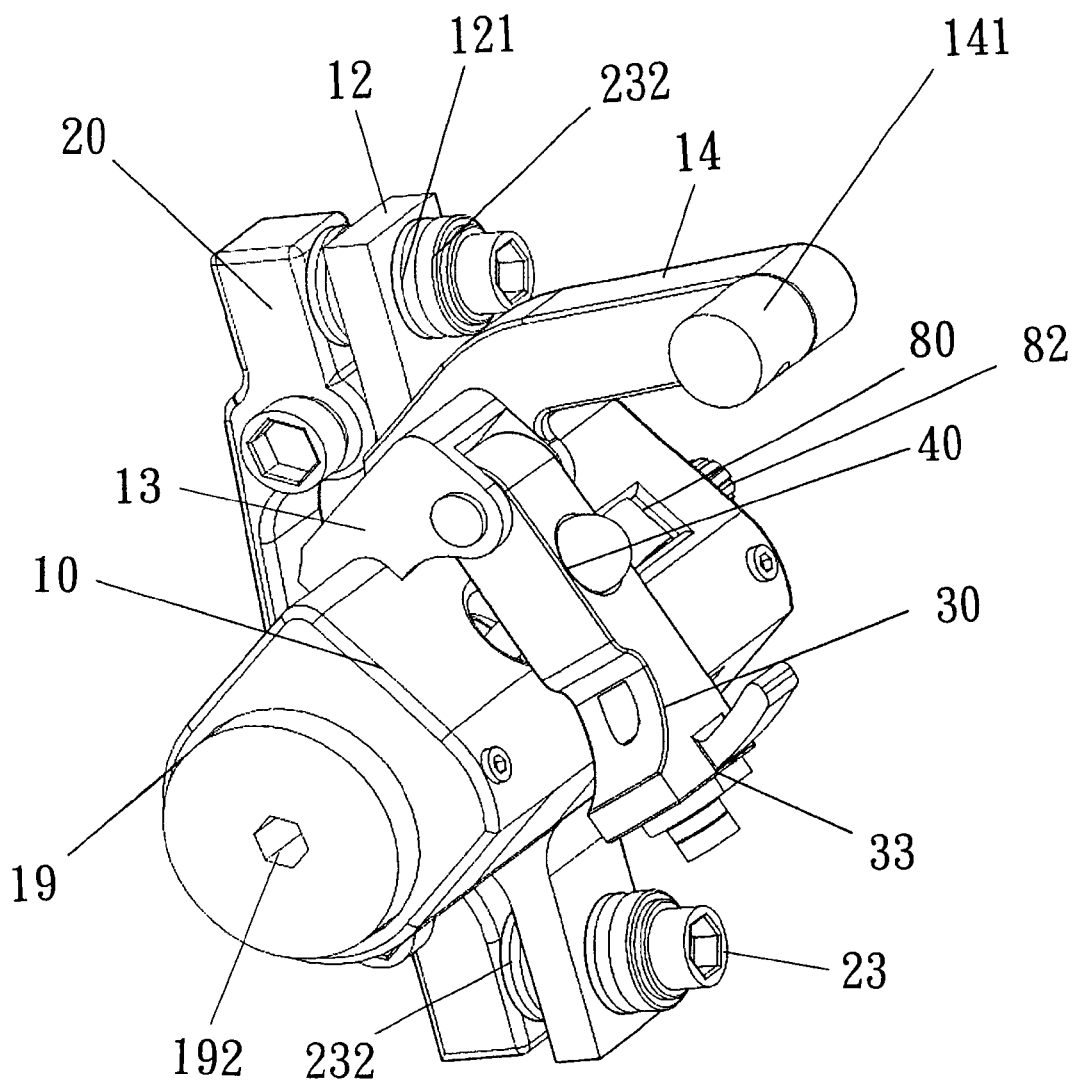
FIG. 1 is an assembled perspective view of a mechanical type disc brake for bicycle according to the present invention.

Please refer to FIGS. 1, 2, 5, and 7. The mechanical type disc brake for bicycle according to the present invention mainly includes a housing 10, a mounting bracket 20, a pull bar 30, an actuating rod 40, a toggle mechanism 50, a pair of sliders 60, two brake linings 70, and a restoring element 80.

Figure 3:
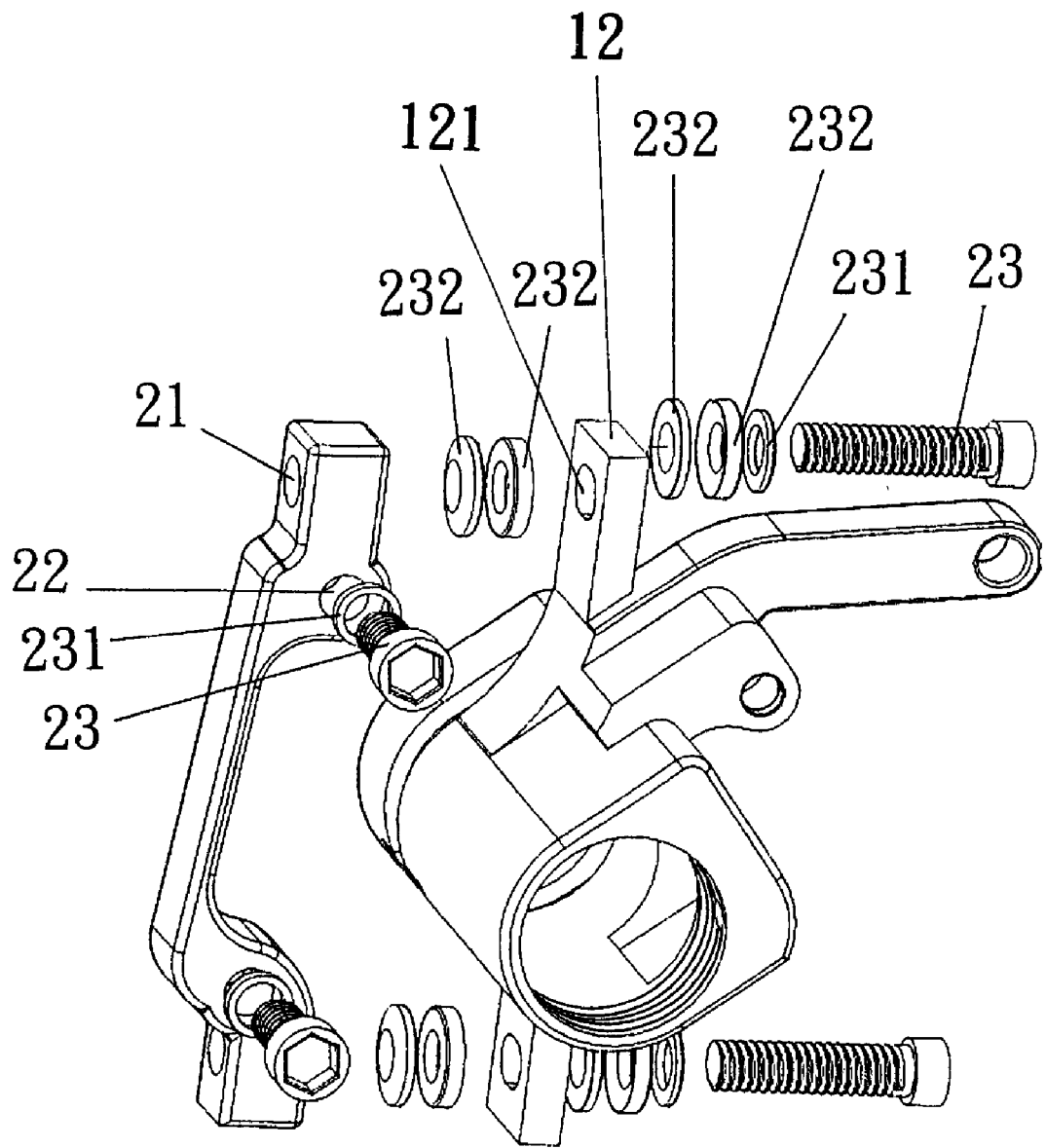
FIG. 3 is an exploded perspective view showing the connection of a mounting bracket to a housing included in the present invention.
Figure 4:
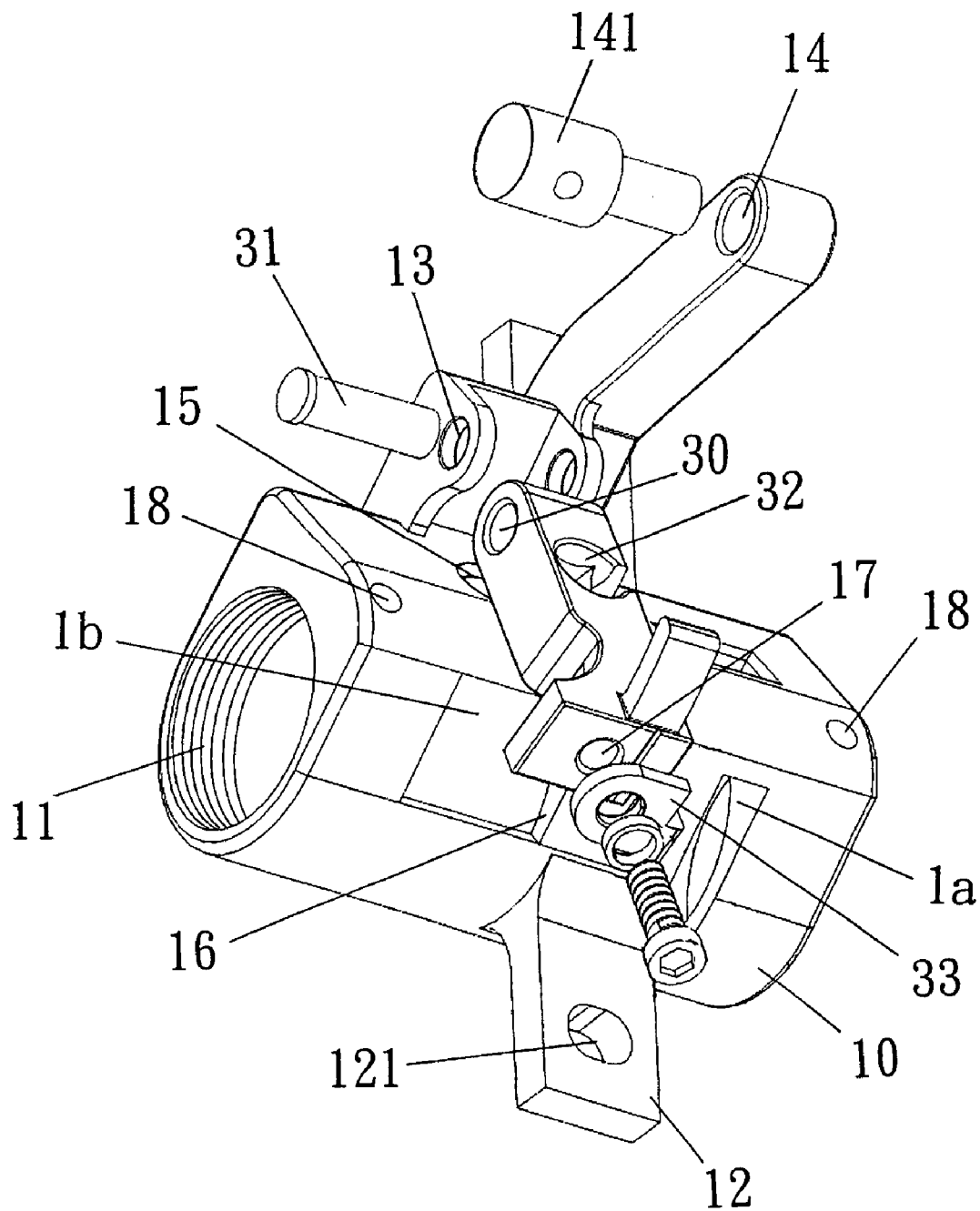
FIG. 4 is an exploded perspective view showing the connection of a pull bar to the housing of the present invention.

As can be seen from FIG. 4, the housing 10 is provided at a central portion with an axial locating space 11 having a multi-stepped bore, and on an outer surface at predetermined positions with outward extended mounting arms 12, a pull-bar shaft holder 13, and a steel cable locating pin holder 14. As can be seen from FIGS. 4 and 9, the housing 10 is also provided at some predetermined positions with differently shaped locating slots 1a, 1b, and 1c, openings 15, 16, and 17, and screw holes 18. Please also refer to FIGS. 3 and 5, the axial locating space 11 is provided at two ends with internally threaded sections 111, and a steel cable locating pin 141 is mounted on the steel cable locating pin holder 14.

Figure 5:
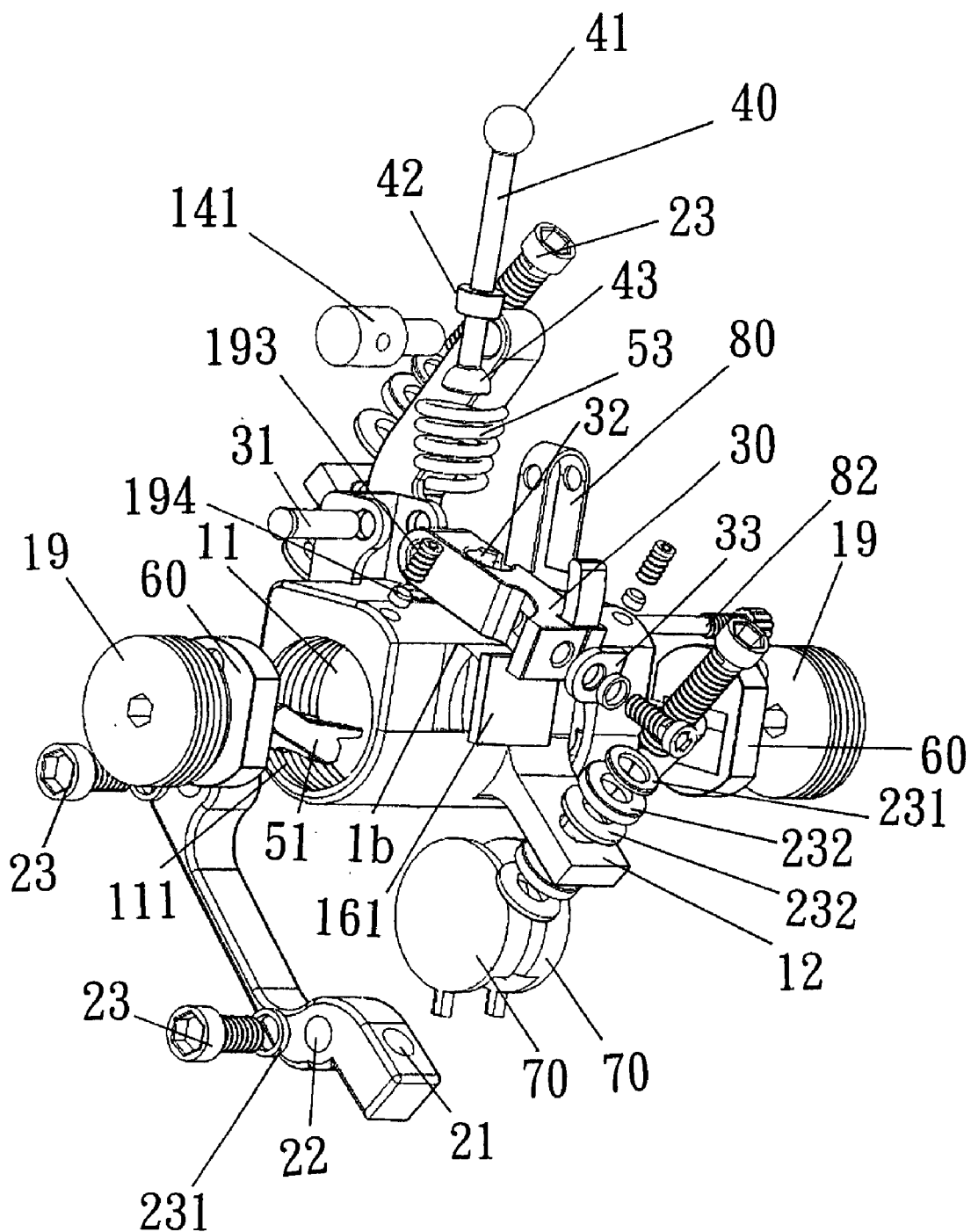
FIG. 5 is an exploded perspective view of the whole system of the present invention.

Please refer to FIGS. 3 and 5. The mounting bracket 20 is connected to the mounting arms 12 on the housing 10 to fix the housing 10 to a predetermined position on a bicycle frame. The mounting bracket 20 has a screw hole 21 and a through hole 22 provided at each end thereof. To connect the mounting bracket 20 to the mounting arms 12, a bolt 23 is sequentially extended through a washer 231, a first pair of disc washers 232, a fixing hole 121 on one mounting arm 12, and a second pair of disc washers 232 into the screw hole 21 at each end of the mounting bracket 20. It is to be noted the disc washers 232 in each pair have corresponding concave and convex surfaces to provide fit surface contact between them and enable adjustments of position and angle of the mounting bracket 20 relative to the housing 10, so that the brake linings 70 may be parallelly spaced from brake discs (not shown) by a predetermined distance. The mounting bracket 20 is then connected to the bicycle frame by extending a bolt 23 through a washer 231 and the through hole 22 at each end of the mounting bracket 20 onto the bicycle frame.

As can be seen from FIG. 4, the pull bar 30 is pivotally connected to the pull-bar shaft holder 13 on the housing 10 by means of a shaft 31. The pull bar 30 is provided near an end close to the shaft 31 with a ball socket 32, and at a distal end opposite to the shaft 31 with a retaining plate 33. A steel brake cable (not shown) is guided from the steel-cable locating pin 141 to the retaining plate 33 to be firmly held to the distal end of the pull bar 30.

Please refer to FIG. 5. The actuating rod 40 includes a ball 41 connected to an upper end thereof, a collar 42 located at a predetermined point in a lower part thereof, and a semispherical retainer ring 43 connected to a lower end thereof. As can be seen from FIGS. 1 and 2, the actuating rod 40 is downward extended through the pull bar 30 and the opening 15 on the housing 10 into the locating space 11 with the ball 41 seated in the ball socket 32 on the pull bar 30.

Figure 6:
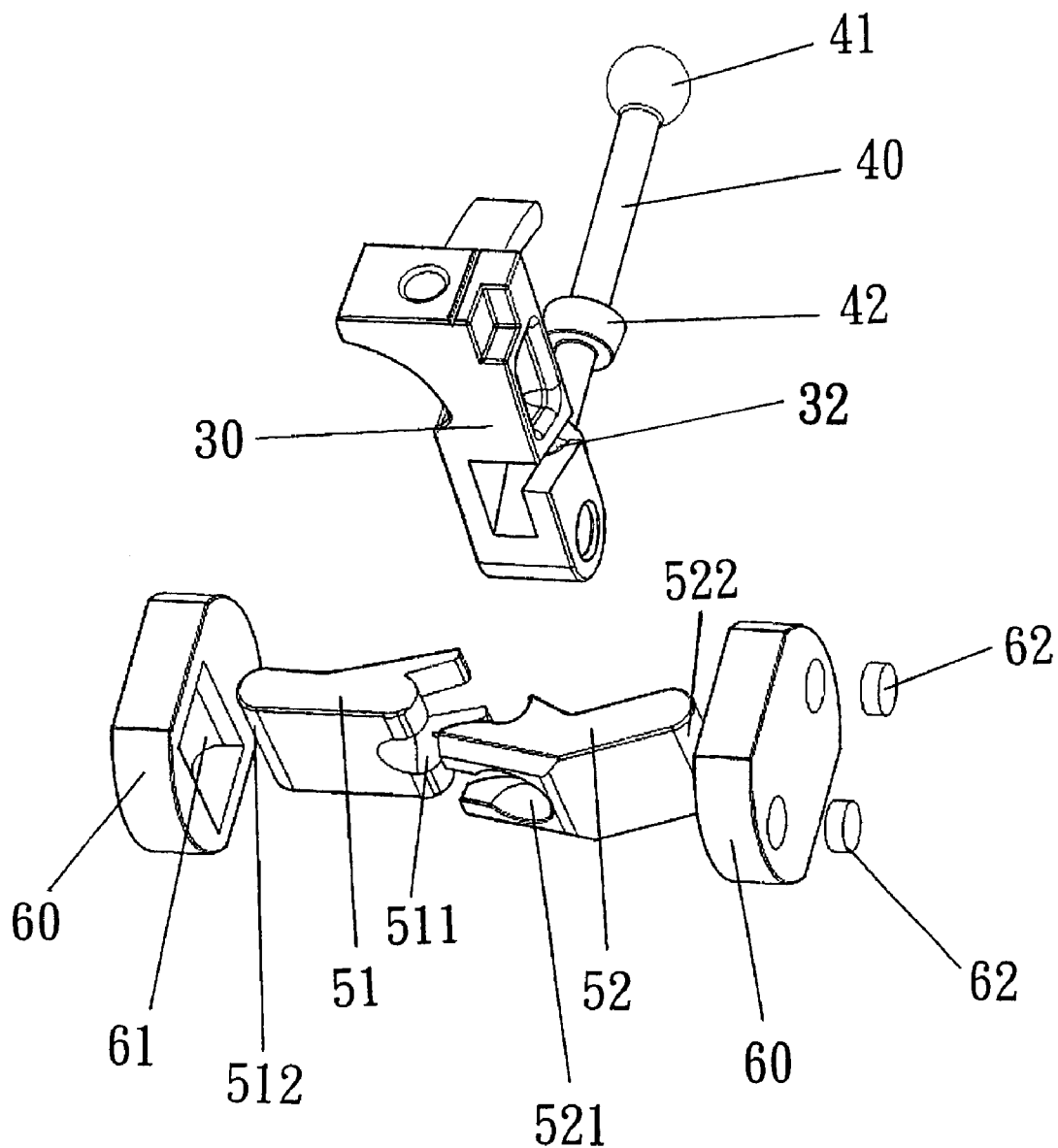
FIG. 6 shows the position of a toggle mechanism included in the present invention relative to other related components.
Figure 7:
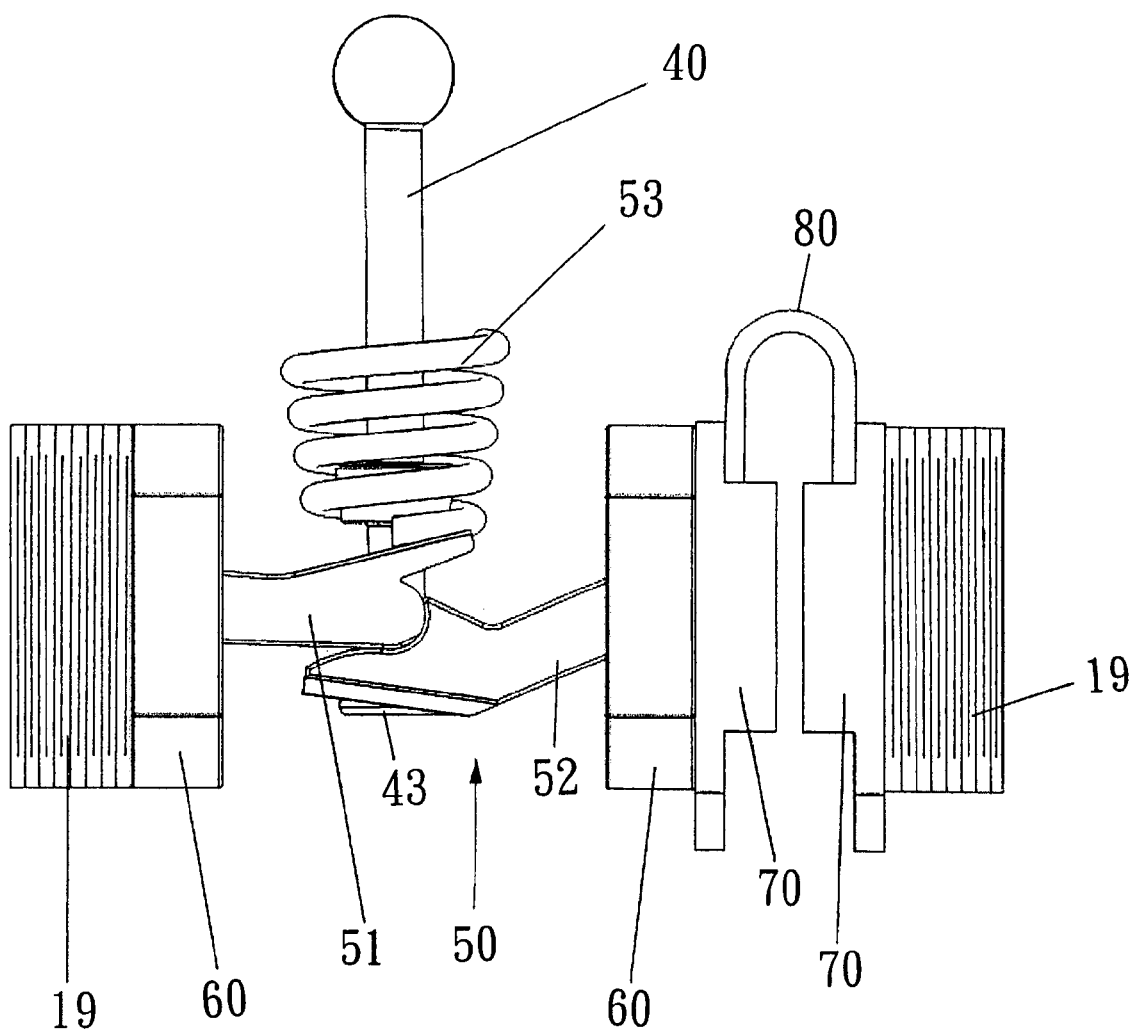
FIG. 7 is a plan view showing the connection of the toggle mechanism of FIG. 6 to other related components of the present invention.

Please refer to FIGS. 6 and 7. The toggle mechanism 50 includes a left and a right actuating block 51, 52 and a conical restoring spring 53. The actuating blocks 51, 52 are flat members having a slightly upward bent configuration and adapted to lap each other at fork-like inner ends thereof. The actuating blocks 51 and 52 are formed at respective fork-like inner ends with central receiving recesses 511 and 521, and at respective rounded outer ends with two push heads 512 and 522. The two actuating blocks 51, 52 are separately positioned into the locating space 11 from two ends of the housing 10 to enclose an upper surface of the retainer ring 43 of the actuating rod 40 in the mutually engaged receiving recesses 511 and 521, and the conical restoring spring 53 is positioned into the locating space 11 from the opening 16 on the housing 10 to locate around the lower part of the actuating rod 40 and elastically extend between the collar 42 on the actuating rod 40 and the locating slot 1b on the housing 10 (see FIG. 4).

Please refer to FIGS. 5, 6, and 7. The sliders 60 are flat members having a cross section matching with that of a bore of the locating space 11. Each of the sliders 60 is provided at an inner side with a locating recess 61, and at an outer side with set-in magnets 62. The two sliders 60 are positioned into the locating space 11 via two ends of the housing 10 to separately locate at two outer sides of the left and the right actuating blocks 51, 52 to press the locating recesses 61 against the push heads 512, 522 of the two actuating blocks 51, 52. Whereby when the actuating mechanism 50 is actuated, the sliders 60 are caused by the actuating blocks 51, 52 to push the brake linings 70 for the same to tightly clamp the brake discs and brakes the bicycle.

Figure 8:
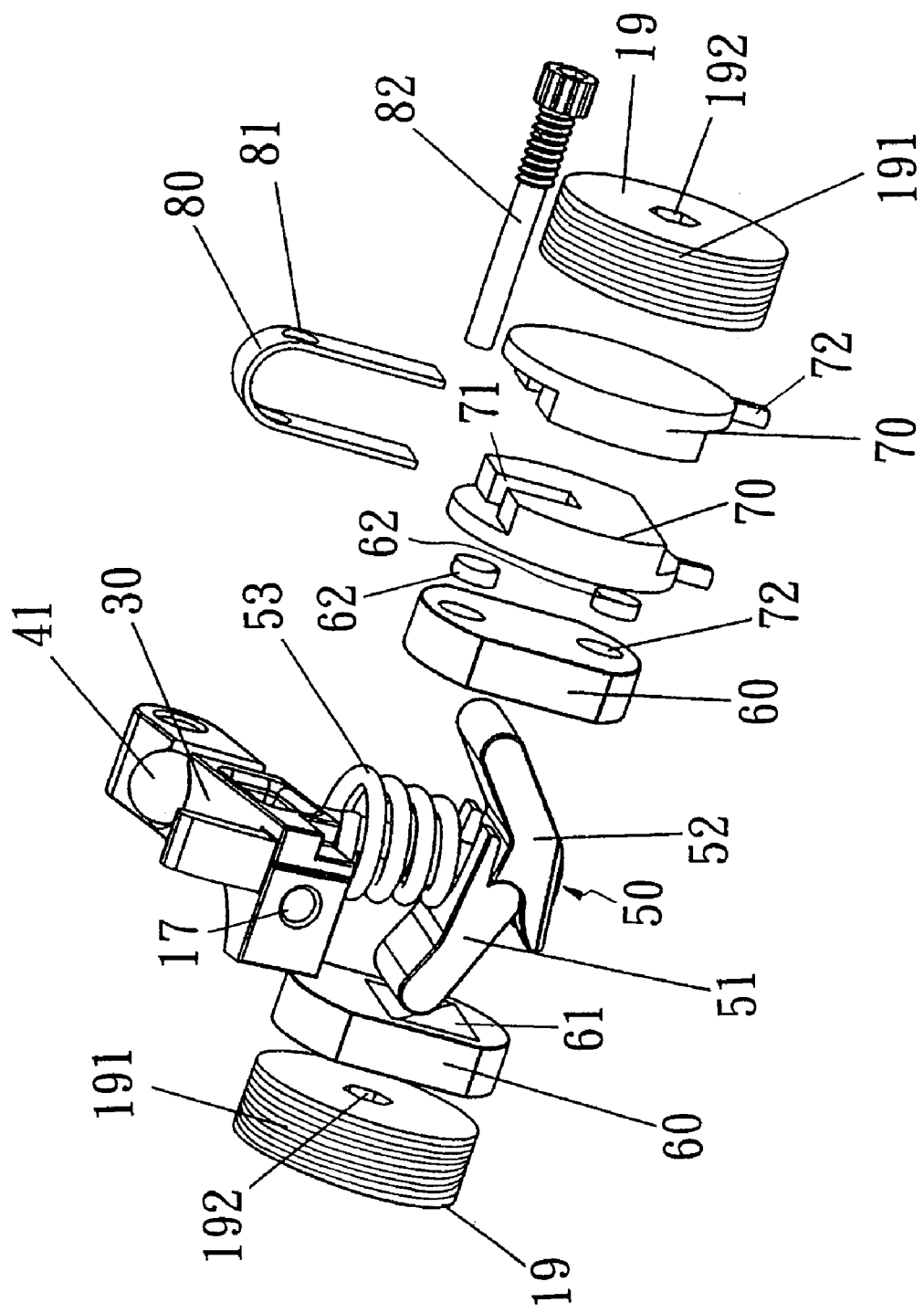
FIG. 8 is an exploded perspective view showing various components of the present invention mounted in a locating space of the housing.
Figure 9:
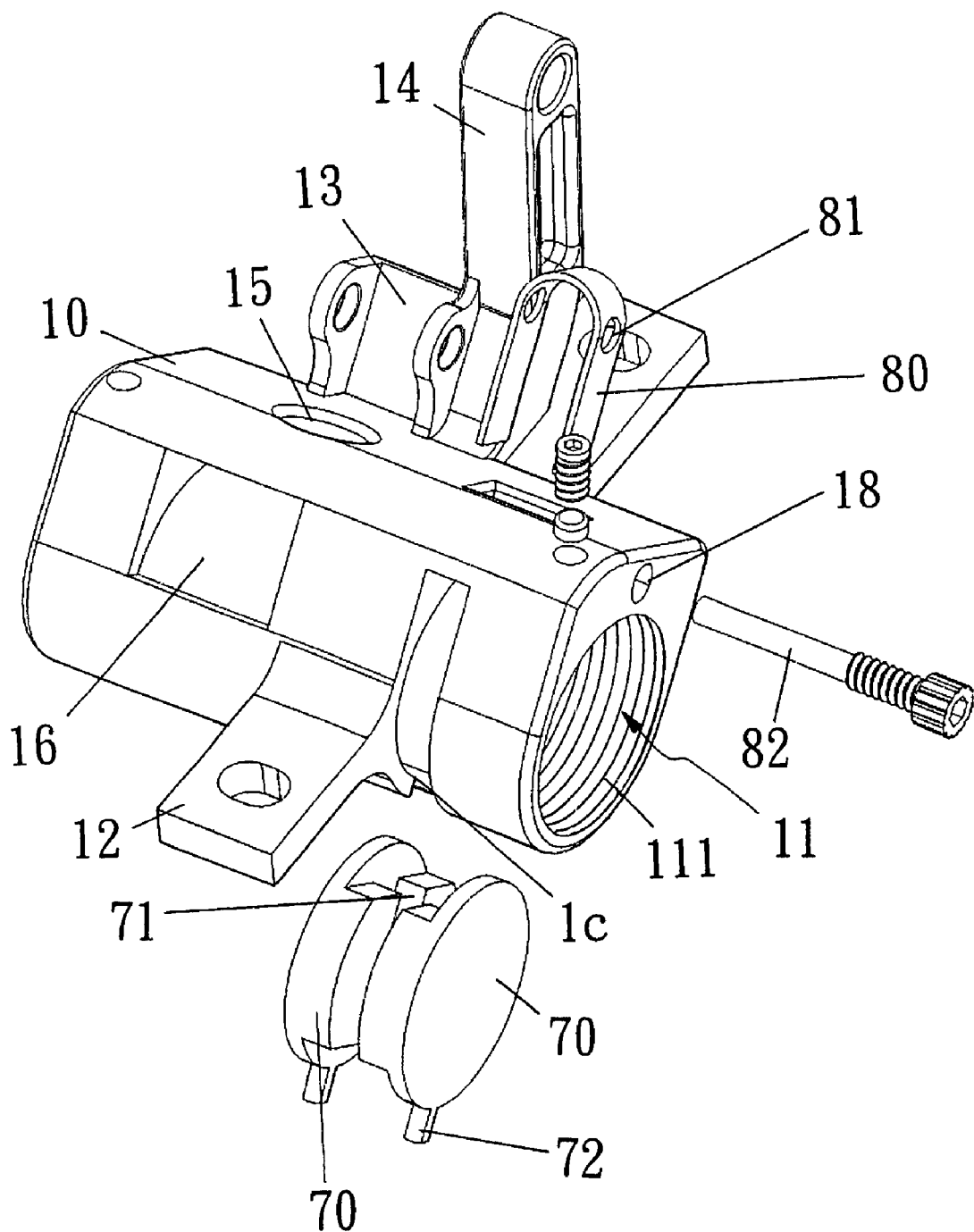
FIG. 9 shows the assembling of brake linings and a restoring element to the housing of the present invention.

Please refer to FIGS. 8 and 9. The two brake linings 70 are two flat members having a cross section matching with that of the locating space 11. The brake linings 70 are provided at respective inner sides facing toward each other with a locating slot 71, and at respective lower ends with a radially outward projected handle 72. An outer side of the braking lining 70 to be in contact with the slider 60 is made of a magnetic material.

The brake linings 70 are positioned into the locating space 11 via the locating slot 1c on the housing 10 with the handles 72 projected from the locating slot 1c.

As can be seen from FIGS. 1, 2, 5, 7, 8, 9, and 10, the restoring element 80 is an inverted U-shaped leaf spring having pin holes 81 provided at predetermined positions thereof. The restoring element 80 is extended from an open end thereof into the housing 10 via the opening 17 on the housing 10 to locate between the locating slots 71 of the two brake linings 70. A fastening pin 82 is screwed through one screw hole 18 provided at one side of the housing 10 near the restoring element 80 into the pin holes 81 to fix the restoring element 80 in place.

After the above-mentioned components are sequentially positioned in place in the locating space 11 of the housing 10, two adjusting caps 19 are screwed onto the two internally threaded sections 111 of the locating space 11. When the pull bar 30 is pulled to cause the actuating rod 40 to vertically act on the toggle mechanism 50, the latter is caused to push the sliders 60 and accordingly the brake linings 70 outward to create a braking effect. In this manner, a friction between the brake linings 70 and the brake discs would not be so strong to lock the brake discs. That is, the present invention may effectively provide an ideal braking curve and upgraded braking force.

The assembling of the present invention will now be described as below.

Figure 10:
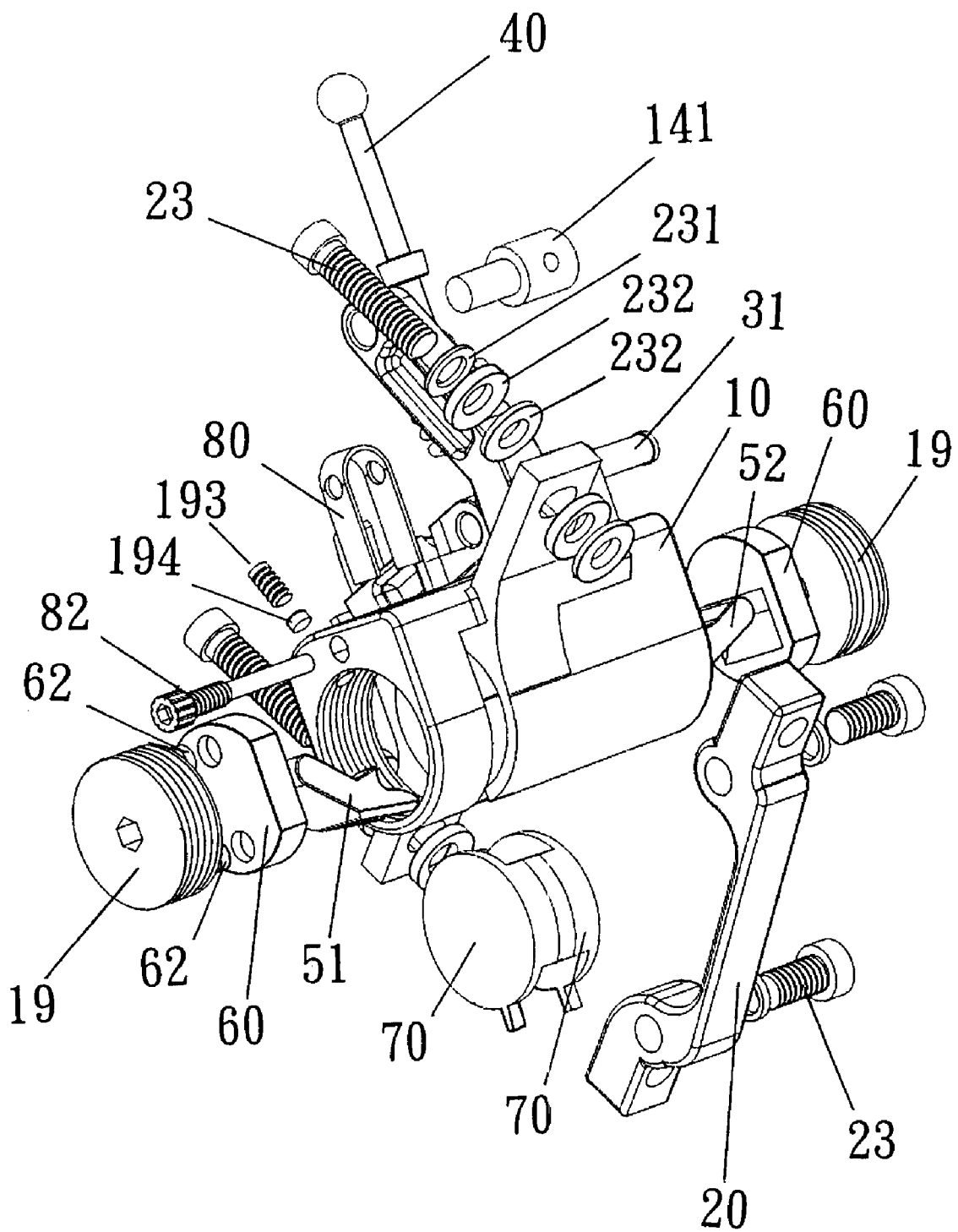
FIG. 10 is another exploded perspective view of the whole system of the present invention viewed from another angle thereof.

Please refer to FIGS. 5 and 10. First position the housing 10 for the pull bar 30 to locate at an upper side of the housing 10 and the opening 16 to face forward, and screw one adjusting cap 19 onto the left end of the locating space 11. Then, sequentially position the first slider 60 and the left actuating block 51 into the locating space 11 from the right end thereof, and extend the lower end of the actuating rod 40 through the restoring spring 53 and position the actuating rod 40 with the restoring spring 53 into the locating space 11 via the opening 15. Allow the ball 41 at the upper end of the actuating rod 40 to seat in the ball socket 32 on the pull bar 30. Position the right actuating block 52 into the locating space 11 via the right end thereof, and fix the left and the right actuating blocks 51, 52 in place via the opening 16. Thereafter, position the second slider 60 into the locating space 11 via the right end thereof, position the brake linings 70 into the locating space 11 via the locating slot 1a, and extend the restoring element 80 into the housing 10 via the opening 17 to locate between the locating recesses 71 of the two brake linings 70. Screw the fastening pin 82 through the screw hole 18 at one end of the housing 10 into the pin holes 81 on the restoring element 80 to hold the latter in place. Finally, screw the other adjusting cap 19 to the right end of the locating space 11. A rubber cap (not shown) is covered on the opening 15 and a transparent cover 161 is mounted over the opening 16 on the housing 10 (see FIG. 2) to protect an interior of the housing 10 against contamination by dust.

After the internal components have been located in the locating space 11 in the above-described steps, connect the mounting bracket 20 to the housing 10 and fasten the mounting bracket 20 to the bicycle frame with bolts 23, and extend the steel cable locating pin 141 into the steel cable locating pin holder 14 for the steel brake cable to extend through the locating pin 141 and be locked to the end of the pull bar 30 by means of the retaining plate 33.

Figure 2:
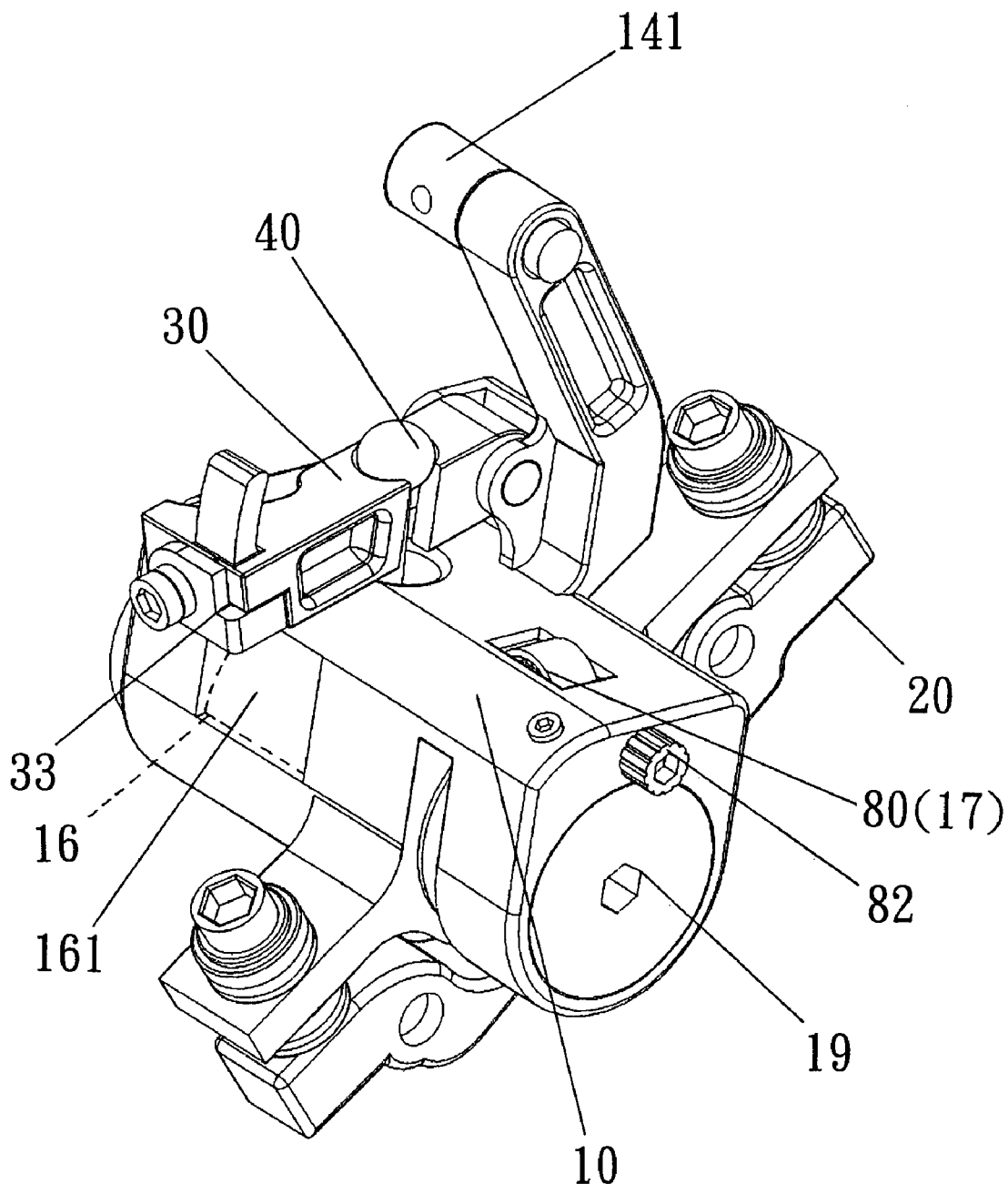
FIG. 2 shows the mechanical type disc brake for bicycle of FIG. 1 from another angle thereof.

After the above-described assembling, the disc brake for bicycle according to the present invention is completed as shown in FIGS. 1 and 2. When the disc brake is used with brake discs and a brake lever mounted on the bicycle, a braking effect may be achieved.

When the pull bar 30 is pivotally connected to the pull-bar shaft holder 13 on the housing 10 by means of the shaft 31, it is important for a distance between the ball socket 32 and the shaft 31 to be properly proportional to a full length of the pull bar 30, so that a force applied by the steel cable to the pull bar 30 is amplified by several times through simple leverage to act on the actuating rod 40. In this manner, a user may pull the brake lever with much reduced efforts. The seating of the ball 41 of the actuating rod 40 in the ball socket 32 on the pull bar 30 not only enables the pull bar 30 to move the actuating rod 40, but also provides sufficient room for the actuating rod 40 to best actuate the toggle mechanism 50 and create the optimum braking effect.

Figure 11:
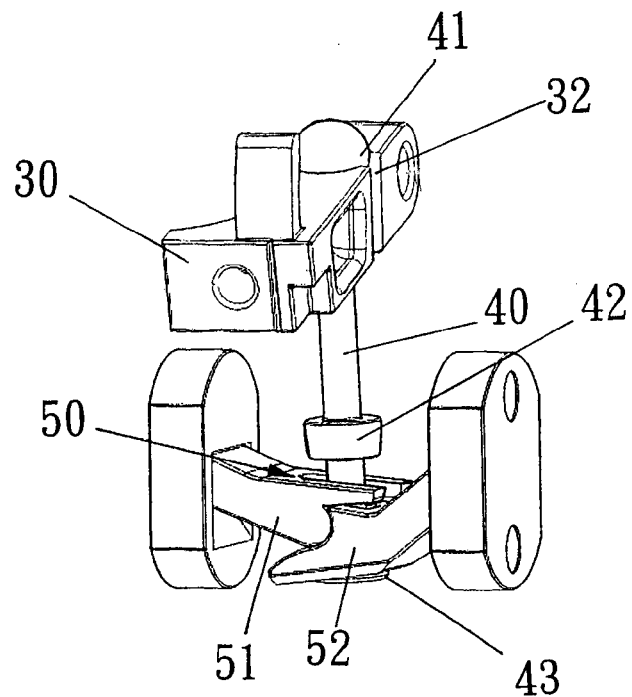
FIG. 11 shows the position of the toggle mechanism relative to other related components before it is actuated.
Figure 12:
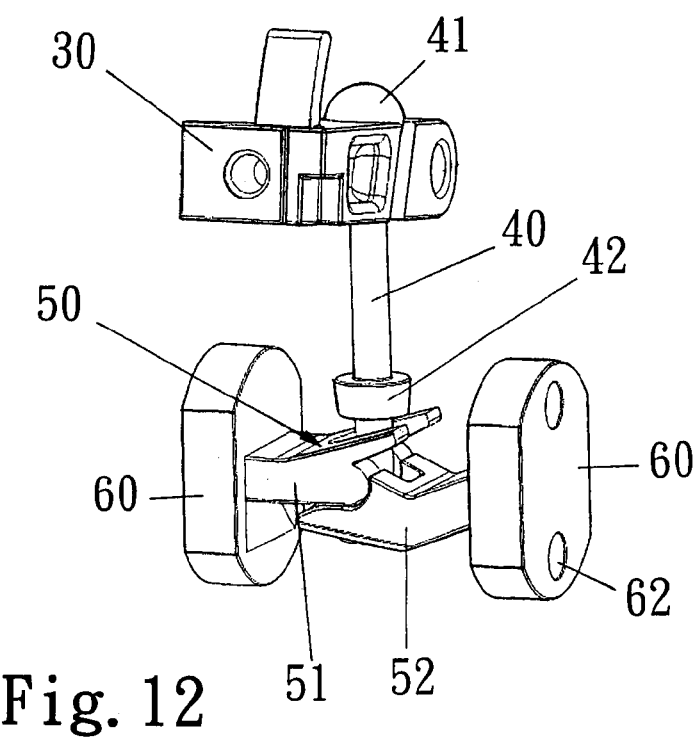
FIG. 12 shows the position of the toggle mechanism relative to other related components after it is actuated.

Please refer to FIGS. 11 and 12. When the pull bar 30 is at a right angle to the actuating rod 40, the toggle mechanism 50 is in a position to produce the largest output. At this point, the push heads 512, 522 of the left and the right actuating blocks 51, 52 are in contact with the locating recesses 61 on the sliders 60 (also refer to FIG. 6). It is to be noted that contact surfaces between the toggle mechanism 50 and the two sliders 60 must be restricted to predetermined geometrical shapes to avoid the toggle mechanism 50 from acting too much to return to its initial position. The predetermined geometrical shapes may include a cambered surface or other functionally equivalent surfaces. When the toggle mechanism 50 is actuated, the two sliders 60 move toward each other and push the brake linings 70 (also refer to FIG. 10) for the same to clamp the brake discs and create the braking effect. When the restoring spring 53 leaves its initial position, it generates a pre-pressing force. When the force applied by the steel cable is removed, the pre-pressing force of the restoring spring 53 provides a restoring force for the toggle mechanism 50. At this point, all the components are in positions the same as the initial positions before they are actuated. The magnets 62 set on the outer side of the slider 60 facing the brake linings 70 always keep the slider 60 in full contact with the opposite brake lining 70 at the contact surfaces when the sliders 60 and the brake linings 70 are actuated to move.

The transparent cover 161 mounted over the opening 16 on the housing 10 may be provided with upper and lower limit scales or colors (not shown) to indicate limit points of wearing of the brake linings 70. A user may observe from outside of the housing 10 via the transparent cover 161 an operating condition of the toggle mechanism 50. When the operation of the toggle mechanism 50 indicates the brake linings 70 have been worn to an extent exceeded the limit scales or color-indicated limit zones, the adjusting caps 19 may be screwed further into the threaded sections 111 of the locating space 11 to maintain a good braking effect.

The adjusting cap 19 is a round member having external threads 191 and a centered hexagonal hole 192 to facilitate turning of the adjusting cap 19 for adjusting purpose. As can be seen from FIGS. 5 and 10, when each of the adjusting caps 19 is screwed onto the locating space 11 of the housing 10, a screw 193 and a washer 194 may be fastened into a screw hole 18 near each end of the housing 10 to prevent the adjusting cap 19 from axially loosening and separating from the housing 10.

The screw 193 and the washer 194 are check means and may be a ratchet or other functionally equivalent mechanisms. When the brake linings 70 are worn off, a suitable tool may be used to turn the adjusting cap 19 at the hexagonal hole 192, so that the adjusting cap 19 is moved forward into the locating space 11 to compensate a thickness of the brake linings 70 that has been worn off and thereby keep the disc brake at a required sensitivity. The adjustment made through the adjusting caps 19 may also adjust the initial position of the toggle mechanism 50 to maintain a required braking curve.

The following are some of the advantages of the present invention:

1. With the toggle mechanism 50 and other related components cooperating with the toggle mechanism, the disc brake of the present invention solves the problem of brake dragging occurred in the conventional mechanical types of disc brake for bicycle due to an overly large frictional force, allowing the disc brake to be used in a much safer manner.

2. With the cooperation of the pull bar 30 with the toggle mechanism 50, the braking force may be effectively increased and an ideal braking curve may be provided. The problems of fatally decreased braking force of conventional rim type braking devices under bad weather and prolonged braking as well as insufficient tail braking force occurred in general disc brakes all can be effectively improved with the present invention.

What is claimed is:

1. A mechanical type disc brake for bicycle, comprising a housing, a mounting bracket, a pull bar, an actuating rod, a toggle mechanism, a pair of sliders, two brake linings, and a restoring element;

said housing being designed for mounting on a fork of the bicycle and locating said mounting bracket, said pull bar, said actuating rod, said toggle mechanism, said sliders, said brake linings, and said restoring element at predetermined positions therein or thereon; said housing being closed at two opposite ends with two adjusting caps screwed thereunto;

said mounting bracket being designed for connecting said housing to said bicycle fork;

said pull bar being a force transmitting member and functioning as an arm of force according to the leverage principle to amplify a braking force;

said actuating rod being connected to said pull bar to convert a force applied via said pull bar into an upward pull that is transmitted to said toggle mechanism via said actuating rod;

said toggle mechanism including a left and a right actuating blocks that are two flat members having a slightly upward bent shape and adapted to lap each other at respective inner ends, and a conical restoring spring; said left and said right actuating blocks being in contact with a lower end of said actuating rod and providing an effective and ideal braking curve through a toggle action to achieve a brake action;

said pair of sliders being located at two outer sides of said toggle mechanism to push said brake linings for the latter to tightly clamp brake discs to create the brake effect;

said brake linings being adapted to stop said brake discs from turning; and said restoring element being mounted between said two brake linings for restoring said brake linings to an initial position thereof;

whereby when said pull bar is pulled to cause said actuating rod to vertically act on said toggle mechanism, said actuating blocks of said toggle mechanism are outward moved to push said pair of sliders and said brake linings to create a brake effect without producing an overly large frictional force between said brake linings and said brake discs to result in locked brake discs while an ideal braking curve and increased braking force may be effectively provided.

2. The mechanical type disc brake for bicycle as claimed in claim 1, wherein said housing is provided at a central portion with an axial locating space, at predetermined positions on an outer surface with outward projected mounting arms, a pull-bar shaft holder, and a steel cable locating pin holder, and at some predetermined positions on said housing with a plurality of locating slots, openings, and screw holes; and a steel cable locating pin is mounted on said steel cable locating pin holder.

3. The mechanical type disc brake for bicycle as claimed in claim 2, wherein said locating space has a multi-stepped bore, and is provided at two ends with an internally threaded section each.

4. The mechanical type disc brake for bicycle as claimed in claim 1, wherein said mounting bracket is provided at each end with a screw hole and a through hole; said mounting bracket being connected to said mounting arms on said housing by extending a bolt through a washer, a first pair of disc washers, a fixing hole on one said mounting arm, and a second pair of disc washers into said screw hole at each end of said mounting bracket; and said mounting bracket being connected to said bicycle fork by extending a bolt through a washer and said through hole at each end of said mounting bracket onto said bicycle fork.

5. The mechanical type disc brake for bicycle as claimed in claim 4, wherein said disc washers in each pair have corresponding concave and convex surfaces to provide fit surface contact between said two disc washers.

6. The mechanical type disc brake for bicycle as claimed in claim 1, wherein said pull bar is pivotally connected to a pull-bar shaft holder on said housing by means of a shaft, and provided near an end close to said shaft with a ball socket, and at a distal end opposite to said shaft with a retaining plate for a steel brake cable guided from a steel-cable locating pin to be firmly held to the distal end of said pull bar via said retaining plate.

7. The mechanical type disc brake for bicycle as claimed in claim 2, wherein said pull bar is pivotally connected to said pull-bar shaft holder on said housing by means of a shaft, and provided near an end close to said shaft with a ball socket, and at a distal end opposite to said shaft with a retaining plate for a steel brake cable guided from said steel-cable locating pin to be firmly held to the distal end of said pull bar via said retaining plate.

8. The mechanical type disc brake for bicycle as claimed in claim 1, wherein said actuating rod is provided at an upper end with a ball, at a predetermined point in a lower part thereof with a collar, and at a lower end with a semi-spherical retainer ring.

9. The mechanical type disc brake for bicycle as claimed in claim 1, wherein said sliders have a cross section matching with that of a locating space in said housing.

10. The mechanical type disc brake for bicycle as claimed in claim 2, wherein said sliders have a cross section matching with that of a bore of said locating space in said housing.

11. The mechanical type disc brake for bicycle as claimed in claim 1, wherein each of said sliders is provided at an inner side with a locating recess, and at an outer side with set-in magnets.

12. The mechanical type disc brake for bicycle as claimed in claim 1, wherein said inner ends of said left and said right actuating block of said toggle mechanism for lapping each other have a fork-like shape, and each of said left and right actuating blocks being formed at said fork-like inner end with a central receiving recess, and at an outer ends with a rounded push heads.

13. The mechanical type disc brake for bicycle as claimed in claim 11, wherein said locating recesses provided on said sliders are in contact with outer ends of said left and right actuating blocks, and contact surfaces between said locating recesses and said outer ends of said actuating blocks are cambered surface or other functionally equivalent surfaces.

14. The mechanical type disc brake for bicycle as claimed in claim 12, wherein said push heads at outer ends of said left and right actuating blocks of said toggle mechanism are in contact with locating recesses provided at inner sides of said sliders, and contact surfaces between said locating recesses and said outer ends of said actuating blocks are cambered surface or other functionally equivalent surfaces.

15. The mechanical type disc brake for bicycle as claimed in claim 1, wherein each of said brake linings is provided at an inner side with a locating slot, and at a lower end with a radially projected handle.

16. The mechanical type disc brake for bicycle as claimed in claim 1, wherein an outer side of one said brake lining in contact with said sliders is made of a magnetic material.

17. The mechanical type disc brake for bicycle as claimed in claim 1, wherein said brake linings have a cross section matching with that of a locating space in said housing.

18. The mechanical type disc brake for bicycle as claimed in claim 2, wherein said brake linings have a cross section matching with that of a bore of said locating space in said housing.

19. The mechanical type disc brake for bicycle as claimed in claim 1, wherein said restoring element comprises an inverted U-shaped leaf spring, and said U-shaped restoring element being mounted between said two brake linings with two ends thereof separately located in two locating slots provided at two inner sides of said brake linings.

20. The mechanical type disc brake for bicycle as claimed in claim 15, wherein said restoring element comprises an inverted U-shaped leaf spring, and said U-shaped restoring element being mounted between said two brake linings with two ends thereof separately located in said two locating slots provided at two inner sides of said brake linings.

21. The mechanical type disc brake for bicycle as claimed in claim 19, wherein said restoring element is provided at predetermined positions with two pin holes, and a fastening pin being screwed through a screw hole provided at one side of said housing near said restoring element into said pin holes to fix said restoring element in place.

22. The mechanical type disc brake for bicycle as claimed in claim 20, wherein said restoring element is provided at predetermined positions with two pin holes, and a fastening pin being screwed through a screw hole provided at one side of said housing near said restoring element into said pin holes to fix said restoring element in place.

23. The mechanical type disc brake for bicycle as claimed in claim 2, wherein one of said openings provided on said housing via which said actuating rod is extended into said locating space is covered with a rubber cap to protect an interior of said locating space against contamination by dust.

24. The mechanical type disc brake for bicycle as claimed in claim 2, wherein one of said openings provided on said housing via which said conical restoring spring of said toggle mechanism is mounted into said locating space in said housing has a transparent cover mounted thereto, and said transparent cover being provided at predetermined positions with scales or colors to indicate limit points of wearing of said brake linings.

25. The mechanical type disc brake for bicycle as claimed in claim 1, wherein each of said adjusting caps is an externally threaded round member and provided at a predetermined position with a hexagonal hole to facilitate turning of said adjusting cap, and said adjusting cap being held in place in each end of said housing by a screw extended through a washer into a screw hole provided on said housing corresponding to said adjusting cap.

26. The mechanical type disc brake for bicycle as claimed in claim 2, wherein each of said adjusting caps is an externally threaded round member and provided at a predetermined position with a hexagonal hole to facilitate turning of said adjusting cap, and said adjusting cap being held in place in each end of said locating space in said housing by a screw extended through a washer into one of said screw holes provided on said housing corresponding to said adjusting cap.

27. The mechanical type disc brake for bicycle as claimed in claim 25, wherein said screw and said washer for holding each said adjusting cap in place in said housing are check means and may be a ratchet or other functionally equivalent mechanisms.

28. The mechanical type disc brake for bicycle as claimed in claim 26, wherein said screw and said washer for holding each said adjusting cap in place in said locating space of said housing are check means and may be a ratchet or other functionally equivalent mechanisms.

29. The mechanical type disc brake for bicycle as claimed in claim 6, wherein a first distance between said shaft of said pull bar and said retaining plate is larger than a second distance between said shaft to said ball socket, and said second distance being in a predetermined proportion to said first distance to enable a force applied via said pull bar to said actuating rod to be amplified by several times depending on said predetermined proportion as a result of leverage.

30. The mechanical type disc brake for bicycle as claimed in claim 7, wherein a first distance between said shaft of said pull bar and said retaining plate is larger than a second distance between said shaft to said ball socket, and said second distance being in a predetermined proportion to said first distance to enable a force applied via said pull bar to said actuating rod to be amplified by several times depending on said predetermined proportion as a result of leverage.

* * * * *